US011961387B2

(12) United States Patent
Otis et al.

(10) Patent No.: US 11,961,387 B2
(45) Date of Patent: Apr. 16, 2024

(54) INTEGRATING LOCATION INFORMATION IN A FIRE CONTROL SYSTEM

(71) Applicant: Honeywell International Inc., Charlotte, NC (US)

(72) Inventors: Jesse Otis, North Haven, CT (US); Robert A. Harrison, Canton, GA (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/685,534

(22) Filed: Mar. 3, 2022

(65) Prior Publication Data

US 2022/0189288 A1 Jun. 16, 2022

Related U.S. Application Data

(63) Continuation of application No. 16/849,795, filed on Apr. 15, 2020, now Pat. No. 11,270,574.

(51) Int. Cl.
*G08B 29/14* (2006.01)
*G08B 17/00* (2006.01)

(52) U.S. Cl.
CPC .......... *G08B 29/145* (2013.01); *G08B 17/00* (2013.01)

(58) Field of Classification Search
CPC ........ G08B 29/145; G08B 17/00; G08B 7/06; G08B 7/062; G08B 7/068; G08B 5/00; G07C 9/00
See application file for complete search history.

(56) References Cited

U.S. PATENT DOCUMENTS 5,859,706 A * 1/1999 Nagashima .......... G08B 29/145 356/438
5,977,872 A * 11/1999 Guertin .................... G09B 9/00 700/83
9,489,814 B1 * 11/2016 Pettigrew ................ H04L 12/40
(Continued)

FOREIGN PATENT DOCUMENTS

WO 2020055649 3/2020

OTHER PUBLICATIONS

Extended European Search Report for related EP Application No. 21167945.1, dated Sep. 15, 2021 (9 pgs).

*Primary Examiner* — Curtis J King
(74) *Attorney, Agent, or Firm* — Brooks, Cameron & Huebsch, PLLC

(57) ABSTRACT

Integrating location information in a fire control system is described herein. One device includes a memory, and a processor configured to execute executable instructions stored in the memory to receive, from a database external to the fire control system, a graphical representation of a facility and location information associated with a number of components of the fire control system that indicates a location of each respective component in the facility, integrate the location information associated with each respective component of the fire control system in the graphical representation of the facility such that the graphical representation includes a representation of each respective component at a location in the graphical representation that corresponds to the location of that component in the facility, and display, in a user interface, the graphical representation of the facility with the location information associated with each respective component of the fire control system integrated therein.

19 Claims, 2 Drawing Sheets

(56) References Cited

U.S. PATENT DOCUMENTS

| | | | | |
|---|---|---|---|---|
| 9,984,556 | B1 | 5/2018 | Knas et al. | |
| 2003/0230415 | A1* | 12/2003 | Wilson | G08B 17/00 340/584 |
| 2004/0051739 | A1* | 3/2004 | Schmickley | G08B 29/188 715/772 |
| 2004/0080407 | A1* | 4/2004 | Reghetti | G06F 30/00 340/506 |
| 2005/0113075 | A1 | 5/2005 | Haberman et al. | |
| 2005/0113115 | A1 | 5/2005 | Haberman et al. | |
| 2005/0128071 | A1* | 6/2005 | Faltesek | G08B 17/00 340/506 |
| 2005/0280527 | A1* | 12/2005 | Farley | G08B 29/145 340/514 |
| 2007/0008099 | A1* | 1/2007 | Kimmel | G08B 25/14 340/506 |
| 2007/0257937 | A1* | 11/2007 | Rye | G06T 11/00 345/617 |
| 2008/0040669 | A1* | 2/2008 | Plocher | G08B 17/00 704/E15.045 |
| 2009/0027225 | A1* | 1/2009 | Farley | G08B 7/06 340/6.11 |
| 2011/0080295 | A1* | 4/2011 | Nakamura | G08B 25/10 340/577 |
| 2011/0294461 | A1 | 12/2011 | Cradick | |
| 2011/0320215 | A1* | 12/2011 | Cooper | G06Q 10/00 705/1.1 |
| 2012/0280812 | A1* | 11/2012 | Sheikman | G01S 13/876 340/539.13 |
| 2012/0320058 | A1* | 12/2012 | Stephen | G06T 15/20 345/428 |
| 2013/0024117 | A1* | 1/2013 | Pavetti | G01C 21/166 701/538 |
| 2013/0139448 | A1* | 6/2013 | Edwards | E04B 1/92 52/1 |
| 2013/0147604 | A1* | 6/2013 | Jones, Jr. | G08B 25/08 340/6.1 |
| 2013/0169817 | A1* | 7/2013 | Jones | G08B 25/00 340/539.2 |
| 2013/0303193 | A1* | 11/2013 | Dharwada | H04W 4/33 455/456.3 |
| 2013/0321161 | A1* | 12/2013 | Chen | G08B 25/14 340/628 |
| 2014/0139681 | A1* | 5/2014 | Jones, Jr. | G08B 27/001 348/159 |
| 2014/0320282 | A1* | 10/2014 | Zhang | G08B 7/066 340/502 |
| 2015/0124087 | A1* | 5/2015 | Jones, Jr. | G08B 15/02 348/143 |
| 2015/0330796 | A1* | 11/2015 | S R | G01C 21/206 701/522 |
| 2016/0011751 | A1 | 1/2016 | Moses et al. | |
| 2017/0169683 | A1* | 6/2017 | Ryder | G01J 1/4204 |
| 2017/0278381 | A1* | 9/2017 | Nalukurthy | G08B 29/145 |
| 2018/0275625 | A1 | 9/2018 | Park et al. | |
| 2018/0276775 | A1 | 9/2018 | Khurana et al. | |
| 2018/0342329 | A1 | 11/2018 | Rufo et al. | |
| 2019/0017719 | A1 | 1/2019 | Sinha et al. | |
| 2019/0087078 | A1* | 3/2019 | Norton | G08B 29/145 |
| 2019/0278745 | A1* | 9/2019 | Brockelsby | G06F 16/148 |
| 2020/0019287 | A1 | 1/2020 | Sahai et al. | |
| 2020/0175842 | A1* | 6/2020 | Merjanian | G06F 3/011 |
| 2020/0357268 | A1* | 11/2020 | Tyson | H04W 4/33 |
| 2020/0394600 | A1* | 12/2020 | Kuo | G06Q 50/26 |
| 2020/0402378 | A1* | 12/2020 | Connell, II | G08B 19/00 |
| 2021/0200910 | A1* | 7/2021 | Fernandez-Orellana | A62B 5/00 |
| 2021/0201273 | A1* | 7/2021 | Lakshmipathy | G06F 30/12 |
| 2021/0240875 | A1* | 8/2021 | Fernandez-Orellana | G06F 30/18 |
| 2021/0248282 | A1* | 8/2021 | Fernandez-Orellana | G06F 30/13 |
| 2021/0256173 | A1* | 8/2021 | Fernandez-Orellana | G06F 30/13 |
| 2022/0076555 | A1* | 3/2022 | Menard | G08B 17/10 |
| 2022/0092720 | A1* | 3/2022 | Henry | G01C 21/206 |

* cited by examiner

INTEGRATING LOCATION INFORMATION IN A FIRE CONTROL SYSTEM

PRIORITY INFORMATION

This application is a Continuation of U.S. application Ser. No. 16/849,795, filed Apr. 15, 2020, the contents of which are incorporated herein by reference in its entirety.

TECHNICAL FIELD

The present disclosure relates generally to devices methods, and system for integrating location information in a fire control system.

BACKGROUND

Large facilities (e.g., buildings), such as commercial facilities, office buildings, hospitals, and the like, may have fire control systems that can be used to detect and/or manage a fire occurring in the facility. A fire control system may include a number of components located throughout the facility (e.g., on different floors of the facility). For example, a fire control system may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components.

A fire control system may also include a physical fire control panel (e.g., box) installed in the facility that can be used by a user to control the operation of the components of the fire control system. A fire control system may also have a centralized workstation, such as a control room or operating room, that may be located at (e.g., in) the facility or located remotely from the facility. Such a workstation may include a computing device that can be used by a user to monitor and/or control the operation of the components of the fire system, and/or to monitor and/or manage a fire occurring in the facility.

DETAILED DESCRIPTION

Figure 1:
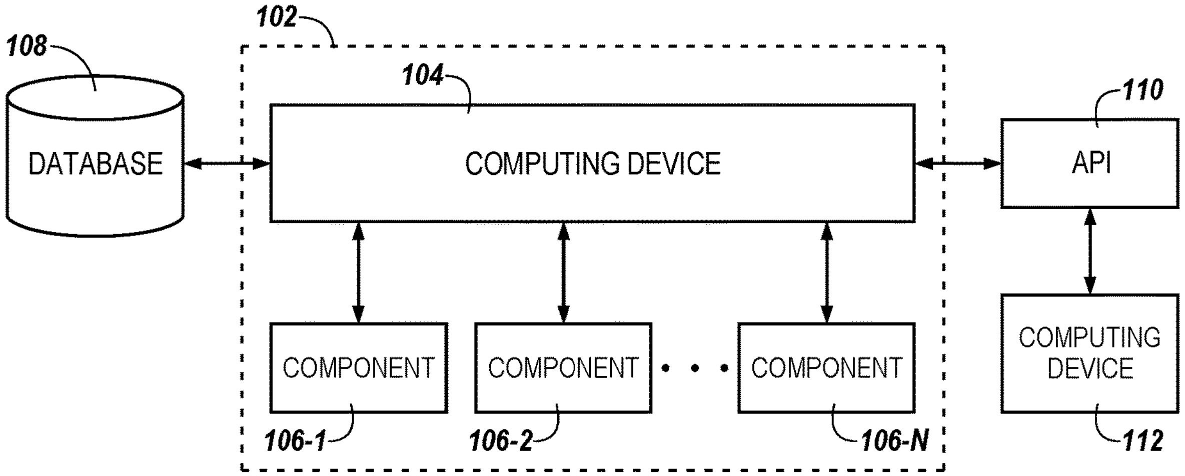
FIG. 1 illustrates an example of a fire control system in accordance with an embodiment of the present disclosure.

Integrating location information in a fire control system is described herein. For example, an embodiment includes a memory, and a processor configured to execute executable instructions stored in the memory to receive, from a database external to the fire control system, a graphical representation of a facility and location information associated with a number of components of the fire control system that indicates a location of each respective component in the facility, integrate the location information associated with each respective component of the fire control system in the graphical representation of the facility such that the graphical representation includes a representation of each respective component at a location in the graphical representation that corresponds to the location of that component in the facility, and display, in a user interface, the graphical representation of the facility with the location information associated with each respective component of the fire control system integrated therein.

A fire control system for a facility in accordance with embodiments of the present disclosure may provide a graphical representation, such as a floor plan or map, of the facility to a user (e.g., operator or technician) of the fire control system. For instance, the graphical representation of the facility can be displayed to the user by a computing device in the workstation of the fire control system. The graphical representation of the facility may include representations of (e.g., icons representing) the different components of the fire control system, with the location of the representation of each respective component in the graphical representation corresponding the location of that component in the facility.

In order to accurately locate the representations of the components in the graphical representation of the facility (e.g., such that the location of the representation of each respective component in the graphical representation accurately corresponds to the location of that component in the facility), the fire control system can utilize information that indicates the locations (e.g., the physical locations) of the different components in the facility. In previous fire control systems, such location information for the components of the fire control system may be entered manually for each respective component by a user of the fire control system. Such a process of manually entering the location information for the components, however, may be time consuming, costly, and/or difficult.

Further, previous fire control systems may not be capable of generating such a graphical representation of the facility. For instance, previous fire control systems may not have the architectural model information for the facility used to generate the graphical representation of the facility. Further, previous fire control systems may only be capable of receiving a textual description of the location information for the components, which may not be sufficient for accurately locating the representations of the components in the graphical representation of the facility.

In contrast, fire control systems in accordance with the present disclosure can receive the location information for the components of the fire control system, and the graphical representation of the facility, from a database external to the fire control system. For instance, the fire control system can receive the location information and graphical representation from the database of an architectural modeling system, such as a building information modeling (BIM) system.

Accordingly, fire control systems in accordance with the present disclosure are capable of generating and providing a graphical representation of the facility that accurately locates representations of the components of the fire control system in the graphical representation, in a manner that is quicker, cheaper, and/or easier than previous fire control systems. For instance, fire control systems in accordance with the present disclosure can eliminate the need for manual entry of the location information for the components by a user of the fire control system.

Further, fire control systems in accordance with the present disclosure can send (e.g., export) the location information for the components of the fire control system, and/or the graphical representation of the facility that includes the representations of the components, to a system external to the fire control system, such as a third party system, that may also utilize such information. Accordingly, embodiments of the present disclosure can also eliminate the need for manual entry of the location information for the components in such an external system, which can reduce the cost and/or difficulty of operating that system as well.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element “04” in FIG. 1, and a similar element may be referenced as 204 in FIG. 2.

As used herein, “a”, “an”, or “a number of” something can refer to one or more such things, while “a plurality of” something can refer to more than one such things. For example, “a number of components” can refer to one or more components, while “a plurality of components” can refer to more than one component. Additionally, the designator “N” as used herein, particularly with respect to reference numerals in the drawings, indicates that a number of the particular feature so designated can be included with a number of embodiments of the present disclosure. This number may be the same or different between designations.

FIG. 1 illustrates an example of a fire control system 102 in accordance with an embodiment of the present disclosure. The fire control system 102 can be the fire control system of a facility (e.g., building), such as, for instance, a large facility having a large number of floors, such as a commercial facility, office building, hospital, and the like. However, embodiments of the present disclosure are not limited to a particular type of facility.

As shown in FIG. 1, fire control system 102 can include a plurality of components 106-1, 106-2, . . . , 106-N located throughout a facility (e.g., on different floors of the facility) that can be used to detect, manage, and/or reduce the impact of a fire occurring in the facility. For example, components 106-1, 106-2, . . . , 106-N may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components. In some embodiments, components 106-1, 106-2, . . . , 106-N can be addressable (e.g. uniquely identifiable) components. In some embodiments, components 106-1, 106-2, . . . , 106-N may include mobile (e.g., movable) components, such as, for instance, monitors on automated external defibrillator (AED) equipment, fire extinguishers, etc.

As shown in FIG. 1, fire control system 102 can include a computing device 104. Computing device 104 can be, refer to, and/or include a laptop computer, desktop computer, or mobile device, such as, for instance, a smart phone or tablet, among other types of computing devices. For example, computing device 104 can include a memory, processor, and user interface, as will be further described herein (e.g., in connection with FIG. 2). However, embodiments of the present disclosure are not limited to a particular type of computing device. Computing device 104 may be part of a centralized workstation of fire system 102, such as a control room or operating room, that may be located at (e.g., in) the facility or located remotely from the facility.

Computing device 104 can be used by a user (e.g., an operator or technician) to monitor and/or control components 106-1, 106-2, . . . , 106-N (e.g., the operation of components), and/or to monitor and/or manage a fire occurring in the facility. Further, computing device 104 can receive (e.g., collect) data, such as, for instance, real-time operational data, associated with components 106-1, 106-2, . . . , 106-N. Such data can include, for instance, current operational status, operational states, and/or properties of components 106-1, 106-2, . . . , 106-N.

In some embodiments, computing device 104 can directly (e.g., without any intervening elements) monitor and control components 106-1, 106-2, . . . , 106-N, and can directly receive data from components 106-1, 106-2, . . . , 106-N. Although not shown in FIG. 1 for simplicity and so as not to obscure embodiments of the present disclosure, in some embodiments fire system 102 can also include a physical fire control panel (e.g., box) installed in the facility that can be used by a user to monitor and/or control components 106-1, 106-2, . . . , 106-N and/or receive data from components 106-1, 106-2, . . . , 106-N. The control panel may be coupled to and/or in communication with computing device 104.

In some embodiments, computing device can monitor and control components 106-1, 106-2, . . . , 106-N, and receive data from components 106-1, 106-2, . . . , 106-N via a wired or wireless network (not shown in FIG. 1 for simplicity and so as not to obscure embodiments of the present disclosure). The network can be a network relationship through which computing device 104 can communicate with the components 106-1, 106-2, . . . , 106-N of the fire control system 102. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to, computing device 104 and the components 106-1, 106-2, . . . , 106-N of the fire control system 102 via a wired or wireless network.

As used herein, a “network” can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 1, computing device 104 can be in communication with a database 108 that is external to fire control system 102. For example, database 108 can be a database of an architectural modeling system, such as, for instance, a building information modeling (BIM) system (e.g., database 108 can be a BIM database). Computing device 104 can communicate with database 108 via a wired or wireless network, which can be the same network through which computing device 104 communicates with components 106-1, 106-2, . . . , 106-N, or a different network.

Computing device 104 can receive a graphical representation, such as a floor plan or a map, of the facility from (e.g., stored in) database 108. In examples in which the facility has multiple floors, the graphical representation can include a floor plan or map of each respective floor.

Computing device 104 can also receive location information associated with components 106-1, 106-2, . . . , 106-N from (e.g., stored in) database 108. The location information associated with each respective component 106-1, 106-2, . . . , 106-N can indicate the location (e.g., the physical location) of that component in the facility (e.g., the location information associated with component 106-1 indicates the location of component 106-1 in the facility, the location information associated with component 106-2 indicates the location of component 106-2 in the facility, etc.). For example, the location information associated with each respective component 106-1, 106-2, . . . , 106-N can comprise Cartesian coordinates for that component, including the altitude (e.g., elevation) of the component, and the longitude and latitude of the component. The altitude of the component can indicate which floor of the facility the component is on, and the longitude and latitude of the component can indicate which room of the facility the component is in, for instance.

In some embodiments, the location information associated with components 106-1, 106-2, . . . , 106-N stored in database 108 may have been received from the components themselves. For instance, the location information may have been received the components via Global Positioning System (GPS) or other self-locating technology included in the components.

In some embodiments, the location information associated with components 106-1, 106-2, . . . , 106-N stored in database 108 may have been included in a standard format (e.g., a BIM format) in the graphical representation of the facility that is stored in database 108. For instance, the location information may have been manually entered by a user into the graphical representation, or imported into the graphical representation from an Industry Foundation Classes (IFC) format or other similar BIM format.

Computing device 104 can also receive additional information associated with components 106-1, 106-2, . . . , 106-N from (e.g., stored in) database 108. For example, computing device 104 can receive type information associated with components 106-1, 106-2, . . . , 106-N from database 108. The type information associated with each respective component 106-1, 106-2, . . . , 106-N can indicate the type of that component (e.g., the type information associated with component 106-1 indicates the type of component 106-1, the type information associated with component 106-2 indicates the type of component 106-2, etc.).

As an additional example, computing device 104 can receive address information and/or a label associated with components 106-1, 106-2, . . . , 106-N from database 108. The address information associated with each respective component 106-1, 106-2, . . . , 106-N can indicate the address (e.g., unique identifier) of that component in fire control system 102, and the label associated with each respective component 106-1, 106-2, . . . , 106-N can indicate the label for that component in fire control system 102 (e.g., the address information and label associated with component 106-1 indicates the address and label, respectively, of component 106-1 in fire control system 100, the address information and label associated with component 106-2 indicates the address and label, respectively, of component 106-2 in fire control system 102, etc.).

Computing device 104 can integrate the location information associated with each respective component 106-1, 106-2, . . . , 106-N in the graphical representation of the facility, such that the graphical representation includes a representation of (e.g., an icon representing) each respective component, and the location of the representation of each respective component in the graphical representation corresponds to the location of that component in the facility. For instance, if the location information associated with component 106-1 indicates that component 106-1 is located in room 125 on the first floor of the facility, an icon representing component 106-1 can be integrated in room 125 in the graphical representation of the first floor of the facility.

Computing device 104 can also integrate the type information associated with each respective component 106-1, 106-2, . . . , 106-N in the graphical representation of the facility, such that the graphical representation includes a representation of the type of each respective component in the graphical representation. For example, the visual appearance of the representation of each respective component 106-1, 106-2, . . . , 106-N in the graphical representation can correspond the type of that component. For instance, if the type information associated with component 106-1 indicates that component 106-1 is a smoke detector, an icon representing (e.g., having the visual appearance of) a smoke detector can be used to represent component 106-1 in the graphical representation.

Computing device 104 can also integrate the address information and/or label associated each respective component 106-1, 106-2, . . . , 106-N in the graphical representation of the facility, such that the graphical representation includes a representation (e.g., alphanumeric text) of the address information and/or label associated with each respective component. For instance, if the address information associated with component 106-1 indicates that the address of component 106-1 in fire control system 102 is 1-ABC, and the label associated with component 106-1 indicates that the label for component 106-1 in fire control system 102 is XYZ, the text 1-ABC and/or XYZ can be integrated adjacent (e.g., next) to the icon representing component 106-1 in the graphical representation.

In some embodiments, computing device 104 can send an instruction (e.g., an operational command) to a particular group (e.g., subset) of the components 106-1, 106-2, . . . , 106-N based on the type information and/or location information associated with those components. For instance, computing device 104 can send an instruction to all components of a particular type and/or all components at a particular location in the facility. As an example, computing device 104 can send a command to silence all alarms on the first floor of the facility.

In some instances, database 108 may receive information (e.g., location information, type information, address information, and/or a label) associated with an additional component after computing device 104 has integrated the information associated with components 106-1, 106-2, . . . , 106-N into the graphical representation of the facility. For example, the additional component may be a newly installed component in fire control system 102. In such an instance, computing device 104 can receive the information associated with the additional (e.g., subsequent) component from database 108, and integrate the information associated with the additional component in the graphical representation of the facility, such that the graphical representation includes a representation of the additional component (e.g., along with the representations of components 106-1, 106-2, . . . 106-N), in a manner analogous to that previously described for components 106-1, 106-2, . . . , 106-N.

Computing device 104 can provide the graphical representation of the facility, with the information (e.g., location information, type information, address information, and/or a label) associated with each respective component 106-1, 106-2, . . . , 106-N integrated therein, to a user of computing device 104 (e.g., an operator or technician of fire control system 102). For instance, computing device 104 can display the graphical representation in a user interface of computing device 104, as will be further described herein (e.g., in connection with FIG. 2).

Additionally or alternatively, computing device 104 can send (e.g., export) the information (e.g., location information, type information, address information, and/or a label) associated with each respective component 106-1, 106-2, . . . , 106-N, and/or the graphical representation of the facility with the information associated with each respective component 106-1, 106-2, . . . , 106-N integrated therein (e.g., in a standardized format), to an application program interface (API) 110 and/or computing device 112 of an additional (e.g., third party) system that is external to fire control system 102, as illustrated in FIG. 1. Computing device 104 can communicate with API 110 and/or computing device 112 via a wired or wireless network, which can be the same network through which computing device 104 communicates with components 106-1, 106-2, . . . , 106-N, and/or database 108, or a different network. Computing device 112 can be, for example, a laptop computer, a desktop computer, or a mobile device. However, embodiments of the present disclosure are not limited to a particular type of computing device.

The additional system can be, for example, a heating, ventilation, and air conditioning (HVAC) system of the facility, or a security system of the facility that includes graphic annunciators, intrusion detection components, etc. In some embodiments, the additional system can be remote from the facility, such as a building integration system. In some embodiments, API 110 and computing device 112 can be part of a centralized management platform, such as a building management system, associated with the facility.

API 110 can be a set of routines, protocols, and/or tools (e.g., software development tools) specifying how computing device 108 can interact with fire control system 102 (e.g., receive the information associated with each respective component 106-1, 106-2, . . . , 106-N of fire control system 102, and/or the graphical representation with the information associated with each respective component integrated therein). In the embodiment illustrated in FIG. 1, API 110 is located separate (e.g., remote) from computing device 12, and may be accessed via a wireless connection, for instance. However, in some embodiments, API 110 can be located in (e.g., part of) computing device 112. Further, in some embodiments, computing device 112 may interact with fire control system 102 without the use of API 110.

Figure 2:
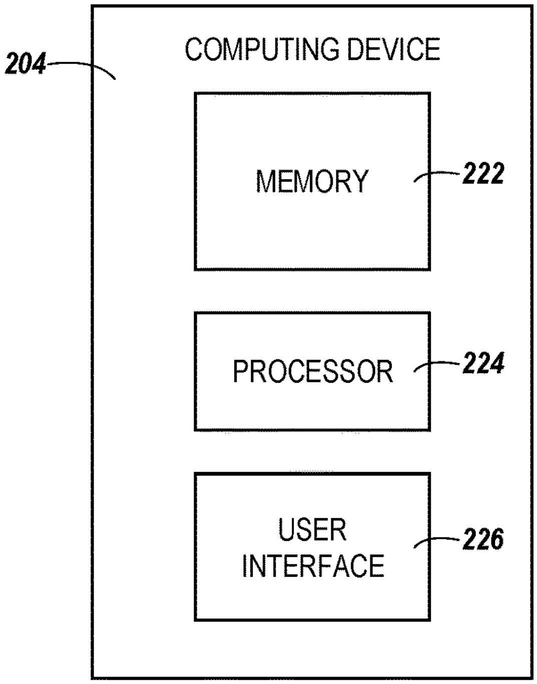
FIG. 2 illustrates an example of a computing device for a fire control system in accordance with an embodiment of the present disclosure.

FIG. 2 illustrates an example of a computing device 204 for a fire control system in accordance with an embodiment of the present disclosure. Computing device 204 can be, for example, computing device 104 previously described in connection with FIG. 1, and the fire control system can be, for example, fire control system 102 previously described in connection with FIG. 1.

As shown in FIG. 2, computing device 204 can include a processor 224 and a memory 222. Memory 222 can be any type of storage medium that can be accessed by processor 224 to perform various examples of the present disclosure. For example, memory 222 can be a non-transitory computer readable medium having computer readable instructions (e.g., computer program instructions) stored thereon that are executable by processor 224 to integrate location information in a fire control system in accordance with the present disclosure. That is, processor 224 can execute the executable instructions stored in memory 222 to integrate location information in a fire control system in accordance with the present disclosure.

Memory 222 can be volatile or nonvolatile memory. Memory 222 can also be removable (e.g., portable) memory, or non-removable (e.g., internal) memory. For example, memory 222 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 222 is illustrated as being located in computing device 204, embodiments of the present disclosure are not so limited. For example, memory 222 can also be located internal to another computing resource (e.g., enabling computer readable instructions to be downloaded over the Internet or another wired or wireless connection).

As shown in FIG. 2, computing device 204 can include a user interface 226. A user (e.g., operator) of computing device 204, such as, for instance, an operator or technician of the fire control system, can interact with computing device 204 via user interface 226. For example, user interface 226 can provide (e.g., display) information to and/or receive information from (e.g., input by) the user of computing device 204. For instance, user interface 226 can display a graphical representation with information (e.g., location information, type information, address information, and/or a label) associated with each respective component of the fire control system integrated therein, as previously described herein.

In some embodiments, user interface 226 can be a graphical user interface (GUI) that can include a display (e.g., a screen) that can provide information to, and/or receive information from, the user of computing device 204. The display can be, for instance, a touch-screen (e.g., the GUI can include touch-screen capabilities). As an additional example, user interface 226 can include a keyboard and/or mouse the user can use to input information into computing device 204, and/or a speaker that can play audio to, and/or receive audio (e.g., voice input) from, the user. Embodiments of the present disclosure, however, are not limited to a particular type(s) of user interface.

Figure 3:
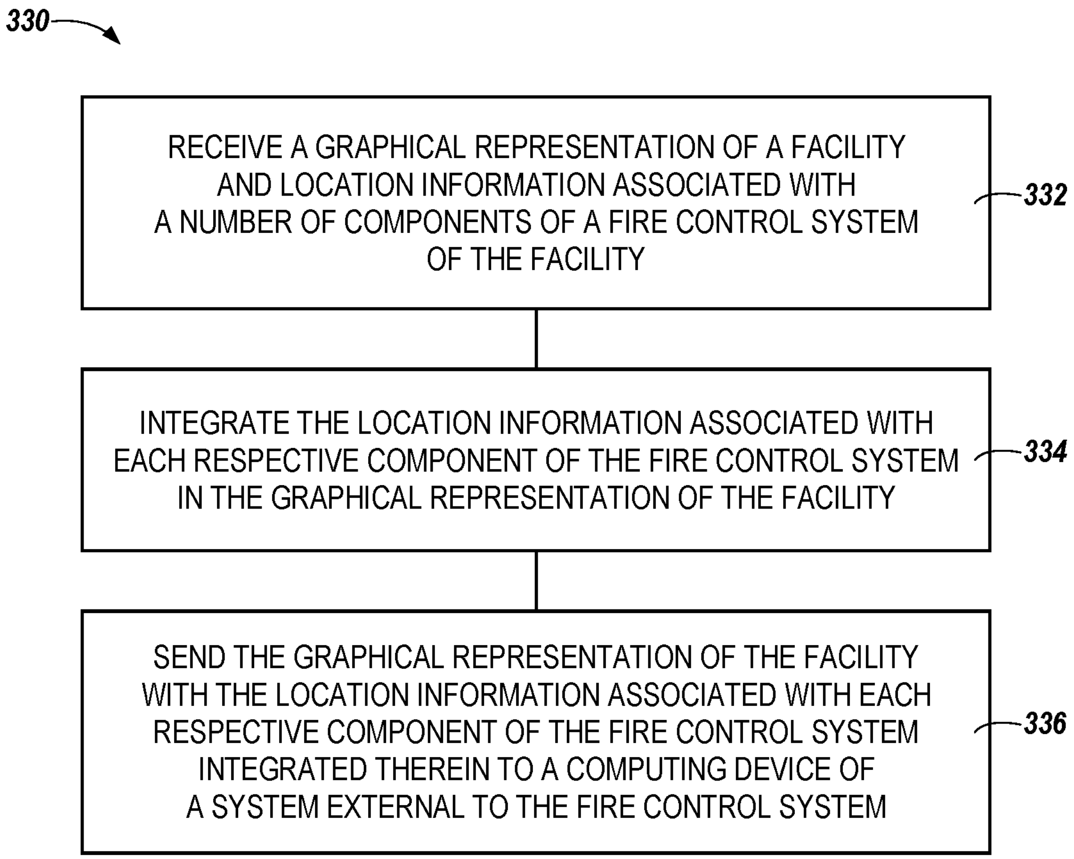
FIG. 3 illustrates an example of a method of operating a computing device for a fire control system in accordance with an embodiment of the present disclosure.

FIG. 3 illustrates an example of a method 330 of operating a computing device for a fire control system in accordance with an embodiment of the present disclosure. The computing device can be, for example, computing device 104 and/or 204 previously described in connection with FIGS. 1 and 2, respectively, and the fire control system can be, for example, fire control system 102 previously described in connection with FIG. 1.

At block 332, method 330 includes receiving a graphical representation of a facility and location information associated with a number of components of a fire control system of the facility. The fire control system of the facility can be, for instance, fire control system 102 of the facility previously described in connection with FIG. 1, and the number of components can be, for instance, components 106-1, 106-2, . . . , 106-N previously described in connection with FIG. 1. The graphical representation of the facility and the location information associated with the number of components can be analogous to the graphical representation and location information previously described in connection with FIG. 1, and can be received from a database external to the fire control system (e.g., from database 108), as previously described in connection with FIG. 1.

At block 334, method 330 includes integrating the location information associated with each respective component of the fire control system in the graphical representation of the facility. The location information can be integrated in the graphical representation in a manner analogous to that previously described in connection with FIG. 1.

At block 336, method 330 includes sending the graphical representation of the facility with the location information associated with each respective component of the fire control system integrated therein to a computing device of a system external to the fire control system. The computing device of the system can be, for instance, computing device 112 of the additional system previously described in connection with FIG. 1, and the graphical representation can be sent to the computing device in a manner analogous to that previously described in connection with FIG. 1.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computing device for a fire control system, comprising:
- a memory; and
- a processor configured to execute executable instructions stored in the memory to:
  - receive, from a database external to the fire control system:
    - a graphical representation of a facility; and
    - type information associated with a number of components of the fire control system, wherein:
      - the number of components include a number of different types of components including sensors, alarms, fans, dampers, and sprinklers; and
      - the type information associated with each respective component indicates which type of the number of different types of components that component is;
    - wherein the database is a database of an architectural modeling system;
  - integrate the type information associated with each respective component of the fire control system in the graphical representation of the facility such that:
    - the graphical representation includes a representation of each respective component; and
    - the graphical representation includes a representation of which type of the number of different types of components each respective component is in the graphical representation; and
  - display, on a user interface of the computing device, the graphical representation of the facility with the type information associated with each respective component of the fire control system integrated therein.

2. The computing device of claim 1, wherein the processor is configured to execute the instructions to receive, from the database external to the fire control system, location information associated with the number of components of the fire control system, wherein the location information associated with each respective component indicates a location of that component in the facility.

3. The computing device of claim 2, wherein the processor is configured to execute the instructions to integrate the location information associated with each respective component of the fire control system in the graphical representation of the facility such that a location of the representation of each respective component in the graphical representation corresponds to the location of that component in the facility.

4. The computing device of claim 1, wherein the processor is configured to execute the instructions to send an instruction to a group of the number of components of the fire control system based on the type information associated with the components of the group.

5. The computing device of claim 4, wherein the group of the number of components of the fire control system comprises all components of the fire control system of a same type of the number of different types of components.

6. The computing device of claim 1, wherein the processor is configured to execute the instructions to send the graphical representation of the facility with the type information associated with each respective component of the fire control system integrated therein to a computing device of a system external to the fire control system.

7. The computing device of claim 1, wherein a visual appearance of the representation of each respective component in the graphical representation of the facility corresponds to the type of that component.

8. A method of operating a computing device for a fire control system, comprising:

receiving, from a database of an architectural modeling system external to the fire control system:

a graphical representation of a facility;

location information associated with a number of components of the fire control system, wherein the location information associated with each respective component indicates a location of that component in the facility; and type information associated with the number of components of the fire control system, wherein:

the number of components include a number of different types of components including sensors, alarms, fans, dampers, and sprinklers; and the type information associated with each respective component indicates which type of the number of different types of components that component is;

integrating the location information and type information associated with each respective component of the fire control system in the graphical representation of the facility such that:

the graphical representation includes a representation of each respective component;

the graphical representation includes a representation of which type of the number of different types of components each respective component is in the graphical representation; and a location of the representation of each respective component in the graphical representation corresponds to the location of that component in the facility; and displaying the graphical representation of the facility with the location information and type information associated with each respective component of the fire control system integrated therein on a user interface of the computing device.

9. The method of claim 8, wherein the method includes displaying the graphical representation of the facility with the location information and type information associated with each respective component of the fire control system integrated therein to a user of the computing device by displaying the graphical representation on the user interface.

10. The method of claim 8, wherein the architectural modeling system external to the fire control system is remote from the facility.

11. The method of claim 8, wherein the architectural modeling system is a building information modeling (BIM) system.

12. The method of claim 8, wherein the method includes integrating address information associated with each respective component of the fire control system in the graphical representation of the facility such that the graphical representation includes a representation of the address information associated with each respective component.

13. The method of claim 8, wherein the method includes integrating a label associated with each respective component of the fire control system in the graphical representation of the facility such that the graphical representation includes a representation of the label associated with each respective component.

14. A non-transitory computer readable medium having computer readable instructions stored thereon that are executable by a processor to:

receive, from a database external to a fire control system:

a graphical representation of a facility;

location information associated with a number of components of the fire control system, wherein the location information associated with each respective component indicates a location of that component in the facility; and type information associated with the number of components of the fire control system, wherein:

the number of components include a number of different types of components including sensors, alarms, fans, dampers, and sprinklers; and the type information associated with each respective component indicates which type of the number of different types of components that component is;

wherein the database is a database of an architectural modeling system;

integrate the location information and type information associated with each respective component of the fire control system in the graphical representation of the facility such that:

the graphical representation includes a representation of each respective component and which type of the number of different types of components each respective component is; and a location of the representation of each respective component in the graphical representation corresponds to the location of that component in the facility; and display the graphical representation of the facility with the location information and type information associated with each respective component of the fire control system integrated therein on a user interface.

15. The computer readable medium of claim 14, wherein the location information and type information associated with the number of components of the fire control system in the database is received from the number of components.

16. The computer readable medium of claim 14, wherein the location information and type information associated with the number of components is in a building information modeling (BIM) format in the database.

17. The computer readable medium of claim 16, wherein the BIM format is an Industry Foundation Classes (IFC) format.

18. The computer readable medium of claim 14, wherein the database is a building information modeling (BIM) database.

19. The computer readable medium of claim 14, wherein the representation of which type of the number of different types of components each respective component is in the graphical representation of the facility is an icon having a visual appearance of which type of the number of different types of components that respective component is.

* * * * *